United States Patent [19]
Citterio

[11] Patent Number: 6,000,055
[45] Date of Patent: *Dec. 14, 1999

[54] MULTIAXIAL, MULTILAYER FABRIC SUITABLE FOR BEING USED FOR BALLISTIC USES AND PROCESS FOR PRODUCING SAID FABRIC

[75] Inventor: Giorgio Celeste Citterio, Monza, Italy

[73] Assignee: F. LLI Citterio S.p.A., Italy

[*] Notice: This patent issued on a continued prosecution application filed under 37 CFR 1.53(d), and is subject to the twenty year patent term provisions of 35 U.S.C. 154(a)(2).

[21] Appl. No.: 08/848,678

[22] Filed: Apr. 29, 1997

[30] Foreign Application Priority Data

Apr. 29, 1996 [IT] Italy .................. MI96A0833

[51] Int. Cl.$^6$ ....................................... F41H 1/02
[52] U.S. Cl. .................................. 2/2.5; 428/911
[58] Field of Search ............... 2/2.5; 139/DIG. 1; 28/101, 102; 428/911, 442

[56] References Cited

U.S. PATENT DOCUMENTS

| | | | |
|---|---|---|---|
| 2,697,054 | 12/1954 | Dietz . | |
| 3,000,772 | 9/1961 | Lunn . | |
| 4,613,535 | 9/1986 | Harpell . | |
| 4,953,234 | 9/1990 | Li et al. ................. | 2/2.5 X |
| 4,989,266 | 2/1991 | Borgese et al. .......... | 2/2.5 |
| 5,124,195 | 6/1992 | Harpell et al. .......... | 2/2.5 X |
| 5,173,138 | 12/1992 | Blauch et al. . | |
| 5,270,094 | 12/1993 | Anahara et al. ......... | 139/DIG. 1 X |
| 5,373,582 | 12/1994 | Dragone et al. ......... | 2/2.5 |
| 5,437,905 | 8/1995 | Park .................... | 2/2.5 X |
| 5,479,659 | 1/1996 | Bachner, Jr. ........... | 2/2.5 |
| 5,512,348 | 4/1996 | Mazelsky ............... | 2/2.5 |
| 5,589,254 | 12/1996 | Dischler ............... | 2/2.5 X |
| 5,619,748 | 4/1997 | Nelson et al. .......... | 2/2.5 |

FOREIGN PATENT DOCUMENTS

| | | | |
|---|---|---|---|
| 0 361 796 | 4/1990 | European Pat. Off. . | |
| 2931110 | 2/1981 | Germany ............... | 2/2.5 |
| WO 90/06389 | 6/1990 | WIPO . | |

*Primary Examiner*—Michael A. Neas
*Attorney, Agent, or Firm*—Pillsbury Madison & Sutro LLP

[57] ABSTRACT

A multiaxial, multilayer fabric (10), suitable for being used for ballistic uses, wherein the threads of a layer (20) are oriented at a whatever angle comprised within the range of from 0 to 360° relatively to the direction of the thread of an adjacent layer (30).

Between the individual layers (20, 30) a layer (40) of either thermoplastic or thermosetting material, or of a bonding substance is interposed, so that the resulting structure, after suitable processing, can be used as a protective garment (60) for sheltering parts of human body, displaying extremely good characteristics of ballistic strength, drapeability, comfort and safety, with lower production costs than prior art.

A process for producing the above mentioned fabric (10) comprising one single step of compressing a plurality of layers (20, 30) of threads which are arranged with layers (40) of thermoplastic or thermosetting materials, or of bonding substances alternately interposed between them.

5 Claims, 3 Drawing Sheets

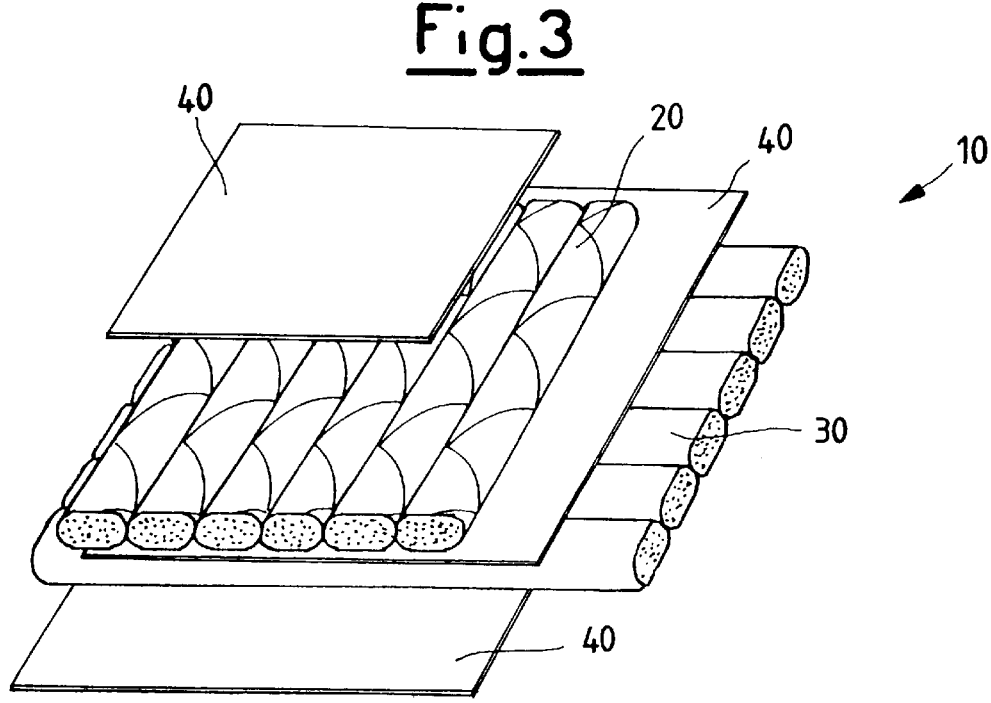
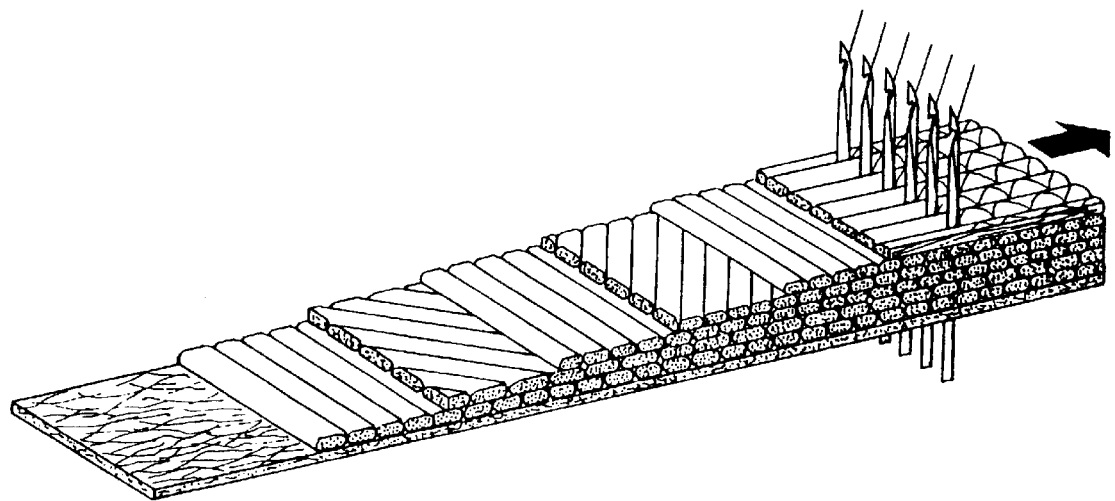

MULTIAXIAL, MULTILAYER FABRIC SUITABLE FOR BEING USED FOR BALLISTIC USES AND PROCESS FOR PRODUCING SAID FABRIC

BACKGROUND OF THE INVENTION

The present invention relates to a multiaxial, multilayer fabric suitable for being used for ballistic uses, and to a process for manufacturing that fabric.

Several types of fabrics are known and are used for manufacturing bulletproof jackets or similar articles of manufacture, which are presently used for ballistic uses.

They can be grouped, for the sake of simplicity, in three categories namely:

1. fabrics manufactured according to a typical weft/warp arrangement, which are simply sewn or coupled to a common matrix;
2. fabrics manufactured as the fabrics from category 1., further, comprising plastic films, nonwovens and/or impregnating resins, as reinforcer elements and;
3. fibrous fabrics with two monoaxial layers mutually superimposed with their fiber directions perpendicular to each other, which are coated on their outermost surfaces with plastic resins or films in order to supply the structure with mechanical strength, and simultaneously, flexibility.

The first type of fabrics is manufactured by means of a by now well mature technology and, owing to this reason, can be manufactured with rather low manufacturing costs.

Furthermore, the ballistic panels manufactured from this type of fabric secure good drapeability and a rather good comfort, because the layers which compose them are mutually bonded by sewing stitches.

The ballistic strength of this type of fabric against bullets is acceptable, but the levels of trauma suffered by the struck regions of wearer's body are very high.

In order to reduce such degree of trauma, more layers of thread must be used, with the consequent result that the weight of the manufactured article considerably increases.

Furthermore, the garments so produced display reduced drapeability and are less comfortable during wearer's movements.

However, this first type of fabric is the most widely used, at present, for ballistic uses of general character.

The resin-treated traditional fabrics display a somewhat higher ballistic strength than the above referenced category 1 fabrics and substantially a rather good flexibility, but suffer from other drawbacks, such as low comfort of use (because their weight is higher), and high production costs.

In order to increase the level of ballistic strength, rigid or semirigid panels are furthermore manufactured which, unfortunately, display negative characteristics from drapeability and comfort viewpoints.

In order to try to overcome the above-mentioned drawbacks without giving up the advantages offered by the above-described structure, the use was furthermore proposed of a biaxial, two-layer fabric made from aramidic or polyethylene materials or the like, coated with flexible resins on the outer surfaces of the layers.

This type of fabric shows a good ballistic strength, however relatively high values of trauma of hit parts of wearer's body are observed. The drapeability is acceptable.

Unfortunately, the manufacturing cycle for this product is particularly complex, because it is carried out batchwise. Furthermore, the threads are arranged perpendicular to each other and that angle cannot be varied.

Furthermore, this type of processing does not allow the manufacturer to mutually superimpose more than two successive thread layers because, when the fabric is bent to fit to the wearer's body, it generates creases which tend to separate the threads from the matrix. Furthermore, the manufacturing costs of a garment manufactured from such a kind of fabric are very high.

SUMMARY OF THE INVENTION

The object of the present invention is to provide a multiaxial, multilayer fabric, suitable for being used for ballistic uses, which may obviate the above-mentioned drawbacks. It is further the object of the present invention to provide a fabric for ballistic panels which retains simultaneously both the high mechanical characteristics of the rigid, resin-treated fabrics, and the drapeability and comfort offered by the fabrics manufactured according to weft/warp typology with sewing stitches, with values of trauma to the wearer's hit body regions being lower than the values of trauma observed in the case of fabrics manufactured according to the techniques known from the prior art.

Another object of the present invention is to provide a protective garment, as a bulletproof jacket, or the like (for example, a helmet), which may secure the maximal protection of the essential organs for life of wearer's body with minimal weight and minimal encumbrance, while simultaneously securing an as high as possible freedom of movement.

Another object of the present invention is to provide a fabric for ballistic uses which can be easily manufactured on an industrial scale by means of known manufacturing technologies, and of pointing out the process for manufacturing it.

Not the least purpose of the present invention is to provide a fabric for ballistic uses, which does not require use of expensive materials or complex or expensive technologies.

Advantageously, the fabric which is the subject-matter of the present invention is constituted by threads arranged in a plurality of thread layers, in which the threads of two adjacent layers are arranged, relative to each other, in two directions, forming an angle within the range between 0 and 360°, as measured by starting from an imaginary reference axis parallel to one of the two directions. The angle in question is preferably of 45° or 135°, in order to secure a proper flexibility. The threads belonging to each same layer are parallel to one another. The manufacturing process for such a kind of structure can be implemented on multiaxial textile machinery of known type from the prior art, having up to eight systems of weft insertion, according to predermined directions. Between two adjacent layers of the fabric, a layer of a thermoplastic or thermosetting material, or a bonding substance is interposed so that, after suitable treatments, the values of ballistic strength are as a result higher than the values which can be reached according to the prior art.

In fact, applying layers of thermoplastic or thermosetting material, or of bonding agents only on the external surfaces of two adjacent layers does not allow acceptable values of ballistic strength to be accomplished, because the two adjacent layers display delamination values which are nearly nil.

The consequence is that the threads belonging to each layer are easily separated and, therefore, cannot oppose a suitable resistance to penetration by foreign bodies, notably including bullets.

The structure produced according to the present invention, in which the thermoplastic or thermosetting film is inserted between adjacent thread layers, overcomes the above-mentioned drawback, because it directly connects two adjacent layers of threads and, moreover, makes it possible to obtain a lower value of trauma of wearer's hit body regions to be obtained than when using the protective fabric as supplied by the prior art, with the weight of the ballistic garment being the same.

BRIEF DESCRIPTION OF THE DRAWINGS

The characteristics of the present invention will be clearer from the following disclosure and accompanying drawings, which relate to an exemplifying, non-limitative embodiment examples, in which:

FIG. 3 shows a perspective view of a multiaxial fabric according to the present invention;

FIG. 4 shows a perspective view of a multiaxial fabric in which the threads are inserted according to directions forming angles of 45° and 90° and.

DETAILED DESCRIPTION

Figure 1:
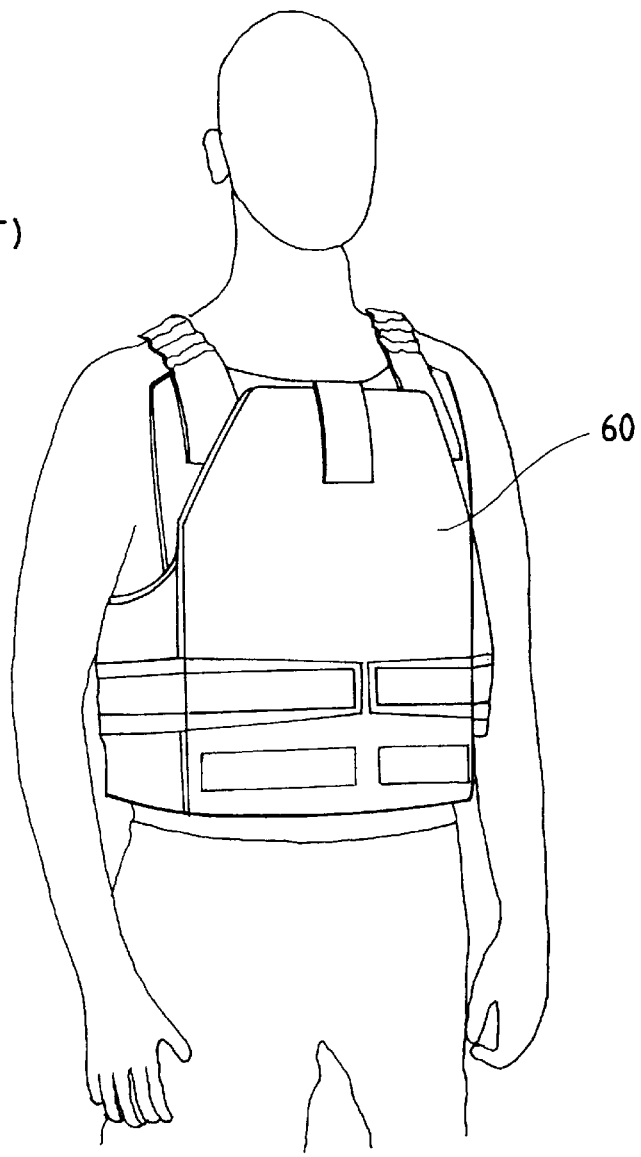
FIG. 1 shows an exemplifying embodiment of a traditional bulletproof jacket.
Figure 2A:
FIGS. 2A and 2B respectively show a plan view and a side elevation view of a biaxial fabric manufactured according to the traditional weft/warp typology, in which the weft fibers and warp fibers are arranged according to mutually perpendicular directions, and mutually crossing.
Figure 2B:
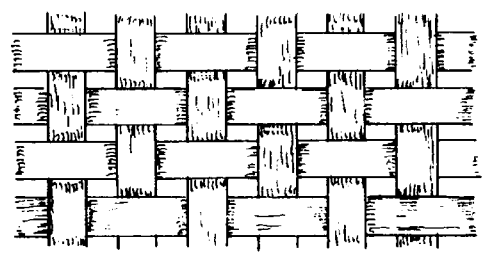

Referring to the above-mentioned figures, the numeral (60) designates a traditional bulletproof jacket, the numeral (10) designates a multiaxial, multilayer fabric according to the present invention, the numerals (20) and (30) respectively designate two layers of threads which are inserted according to two different directions forming a whatever angle to each other, comprised within the range of from 0 to 360° (the angle is measured by starting from an imaginary axis parallel to one of the two directions), and the numeral (40) designates a layer of thermoplastic or thermosetting material, or of a bonding substance, which is arranged interposed between the layers (20) and (30).

Figure 5:
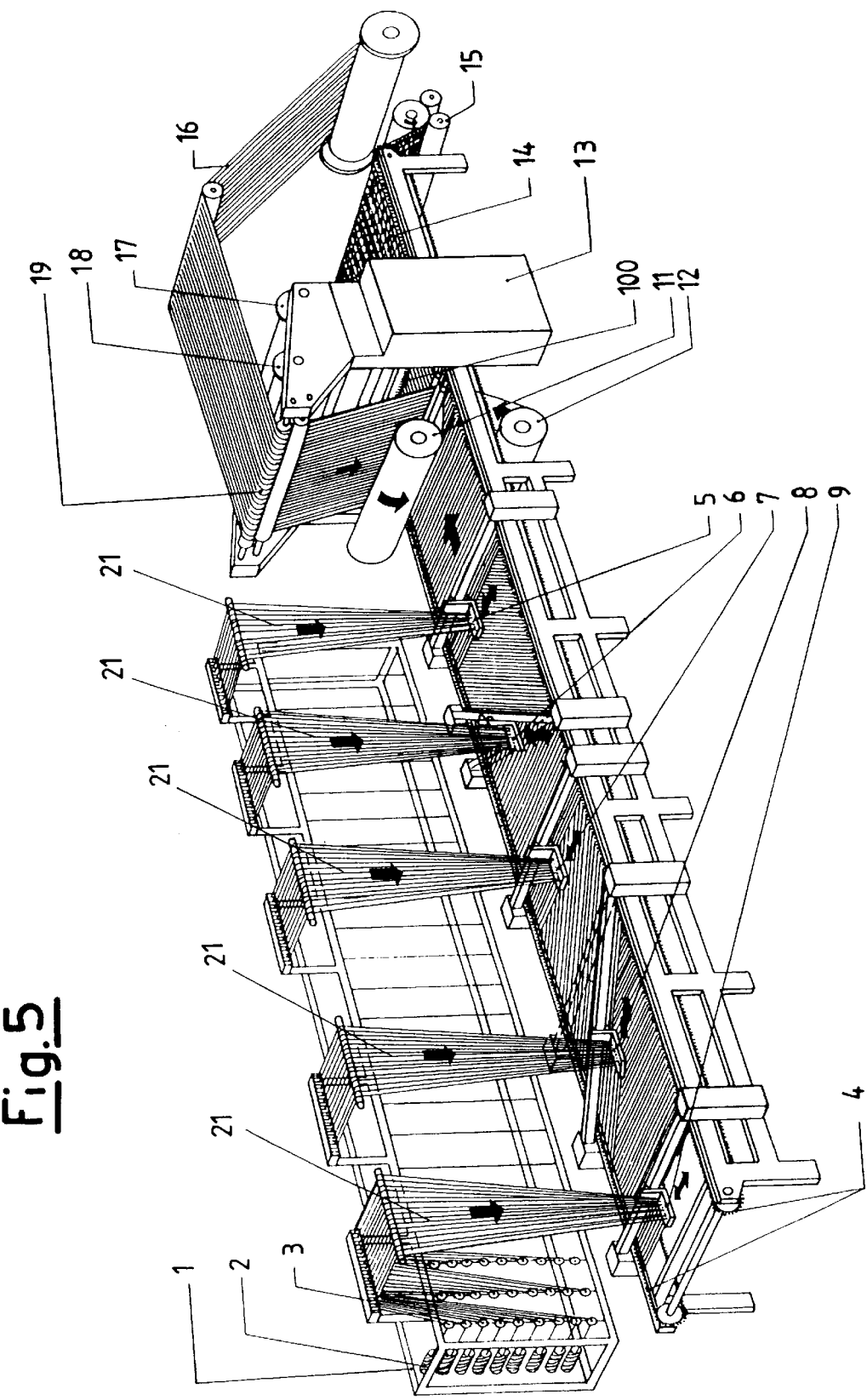
FIG. 5 shows a general perspective view of a multiaxial knitting textile machine, of known type, provided with five weft insertion systems which can be used for manufacturing the fabric according to the present invention.

With particular reference to FIG. 3, this Figure shows, for exemplifying, non-limitative purposes, two layers (20), (30) of threads in which the threads are arranged at an angle of 90° to each other, by means of the multiaxial textile machine of FIG. 5, and, between the layers (20), and (30) of threads a layer (40) of either thermoplastic or thermosetting material, or of a bonding substance, is present.

With particular reference to FIG. 5, the numeral (1) designates a creel which bears the threads (21), the numeral (2) designates the tapered bobbins on which the threads (21) are collected, the numeral (3) designates braking devices, and the numeral (4) designates the thread (21) transport guides.

The numerals (5), (7) and (9) respectively designate three automatic systems for insertion of threads (21) at 90° relative to the longitudinal axis of the textile machine, the numeral (6) designates an automatic system for insertion of threads (21) at 45° relative to the longitudinal axis of the textile machine, and the numeral (8) designates an automatic system for insertion of threads (21) at 135°, again relative to the longitudinal axis of the textile machine.

The numerals (11) and (12) to respectively designate two supplementary feeding bobbins (for example, for feeding the layer (40) of thermoplastic or thermosetting material of of bonding substance), the numeral (100) designates elements which are suitable for binding the threads (21) to one another and to the material coming from both bobbins (11), (12); the numeral (13) designates the apparatus which performs the functions of bonding the threads (21); the numeral (14) designates the finished fabric after the weaving operation, the numeral (15) designates the winding device for the fabric (14), the numeral (16) designates the feed for threads (21) parallel to the longitudinal axis of the textile machine, the numerals (17) and (18) respectively designate the beams for the binding threads (21), and the numeral (19) designates a return roller.

Inasmuch as the textile machine of multiaxial type is capable of inserting the threads (21) at any angle (within the range of from 0 to 360°) relative to the direction of the binding threads (21) from feed (16), according to a preferred, non-limitative embodiment of fabric (10), that angle is selected from values of 0°, 45°, 90°, 135° and 180°, and the respective complementary angles.

The directions of the threads (21) of the layers (20), (30) preferably form an angle of 45°, while both the threads (21) and feed (16) display a unidirectional orientation.

In the this way, a lower bending strength of the so structured fabric (10) is obtained, than as displayed by the solutions known from the prior art.

Furthermore, interposing between two adjacent layers (20), (30) a layer (40) of an either thermoplastic or thermosetting material (powders, nonwovens, bonding agents, films) makes it possible to substantially block a parallel threads (21) from sliding, thus preventing openings from forming, through which a bullet could find its way and completely penetrate the panel of the jacket (60).

With the weight being the same as that of the traditional solutions known from the prior art, the ballistic strength to bullets is higher in the case of fabric (10) of the present invention, because one or more layers can be compacted to each other (from here, the designation of "multilayer fabric"), with an excellent uniformity of ballistic performance being accomplished together with decidedly lower trauma values than the presently existing structures, while simultaneously retaining an extremely high flexibility value.

Furthermore, thanks to the arrangement of threads (21) (and, consequently, of the accomplished ballistic results) also threads with lower performance from a quality viewpoint can be used; with a drastic lowering in costs from used material, with the ballistic performance being the same, as compared to more expensive solutions.

Therefore, the very good results from the viewpoint of ballistic strength make it possible panels for bulletproof jackets (60) to be produced which are not enbloc, hence, which are not stiff, or semi-stiff.

In fact, the plurality of layers (20), (30), (40) generate a highly flexible structure which displays strength characteristics which are comparable to those of stiff products which, on the other hand, do not offer the desired comfort and high movement freedom to the wearer.

Nevertheless, the possibility exists anyway of producing enbloc panels which are manufactured when the ballistic aspect predominates over flexibility.

For exemplifying purposes, in the following some ballistic characteristics are compared of known fabrics from the prior art and of the multiaxial, multilayer fabric of the present invention, based on experimental tests performed using rifle bullets of 0.357 type, ex GECO F.M.J.:

1. Classic weft/warp structure with mutually stitch-bonded layers:
   weight: 8.9 kg/m²; number of layers of fabric: 42; average trauma value to the wearer's hit body region: 19 mm; flexibility: low; costs: high.
2. Classic weft/warp structure, rubber coated fabric, with separate layers:
   weight: 10 kg/m²; number of layers of fabric: 30; average trauma value to the wearer's hit body region: 15 mm; flexibility: high; costs: high.
3. Classic weft/warp structure, stiff version for enbloc ballistic panels, with different types of traditional, resin-coated fabrics:
   weight: 8.25 kg/m²; number of layers of fabric: 26; average trauma value to the wearer's hit body region: 6 mm; flexibility: none; costs: medium.
4. Biaxial structure with two mutually superimposed layers (unidirectional bacthwise process):
   weight: 7.6 kg/m²; number of layers of fabric: 63; average trauma value to the wearer's hit body region: 18 mm; flexibility: medium; costs: high.
5. Multiaxial, multilayer fabric according to the present invention:
   weight: 8.25 kg/m²; number of layers of fabric: 12; average trauma value to the wearer's hit body region: 10 mm; flexibility: medium/high; costs: low.

As stated in the forgoing Summary section, a further object of the present invention is a process for producing the multiaxial, multilayer fabric of the present invention, which allows the production costs of ballistic panels and, in general, of protective garments, as bulletproof jackets (60), helmets, and so forth, to be reduced as compared to traditional methods known from the prior art.

A traditional process for manufacturing a ballistic panel comprises the following steps:
   the fabric, woven according to a weft/warp weaving typology, is impregnated with thermosetting resins and is then charged to suitable molds; and
   a pressure of approximately 100 kg/m² is then applied to the whole structure by means of known equipment in order to express the resin excess, so as to reach values of resin level of approximately 10–20% relatively to the total structure.

However, the above described method suffers from a large number of drawbacks, such as lack of uniformity of resin concentration, leading to unacceptable values of ballistic strength in particular spots of the fabric which become preferential routes through which the bullet can find its way to penetrate the fabric, the extremely high precision which must be respected when manufacturing the molds, the need for using forming elements with precise and and preset bending radiuses, high pressures and the need for using resins which are harmful to human subjects and the environment, the high costs of necessary apparatus for performing the process, and, finally, the need for storing the impregnated fabric with particular precautions.

On the contrary, the process for manufacturing the multiaxial, multilayer fabric according to the present invention comprises one single compressing step, also at high temperature, of one or more layers, to be performed by using extremely cheap equipment, because high expressing pressures must not be reached, to the contrary of heretofore conventional requirements.

On the contrary, it is enough that the fabric layers be piled up on one another and that between two adjacent layers the same film of either thermoplastic or thermosetting material, which is already present inside the structure, according to the manufacturing process as mentioned above, be inserted, with the whole resulting structure being then compacted.

This operation allows an absolute constancy of mechanical characteristics and ballistic fabric parameters to be accomplished throughout the panel surface.

Furthermore, the complete flexibility of the layers does not pose problems of drapeability and secures the highest freedom of movement and maximal comfort to the wearer.

It is therefore clear that a plurality of layers can be superimposed upon each other, so as to reach lower values of trauma to the hit body region without thereby incuring other drawbacks, as heavy weight of structure or panel stiffness.

From the above disclosure, the characteristics will be clear of the multiaxial, multilayer fabric and of the process for manufacturing it, which are the subject-matter of the present invention, as well as the advantages offered by them will be clear.

In particular, such advantages are the following:
   high flexibility values as compared to the traditional solution known from the prior art, with the weight being the same;
   high values of ballistic strength, as compared to the traditional solution, with the weight being the same;
   lower trauma values than as shown by the traditional solution of soft type, with the weight being the same;
   uniformity of the mechanical characteristics throughout the protective surface;
   high characteristics of drapeability and comfort;
   the bulletproof jackets manufactured form this type of fabric secure the highest protection of essential organs for wearer's life with minimal weight, while simultaneously securing the maximal freedom of movement;
   low manufacturing costs and;
   the possibility of using lower-performance types of fibers exists.

It will be clear that many changes can be supplied to the multiaxial, multilayer fabric according to the present invention, without thereby departing from the principles of novelty inherently contained in the inventive idea, as well as it will be clear that, when practically implementing the invention, the materials, the shapes and the size of the illustrated details can be any, according to the requirements, and that the same can be replaced by other technically equivalent details.

For example, in the front side of a bulletproof jacket manufactured from this type of fabric, Velcro hook and fleece fasteners can be provided in order to allow an additional panel of fiber-ceramic composite material to be applied in order to increase the protection level and stop high-speed bullets.

According to an alternative embodiment, to the same fasteners an additional pelvic protection can be applied.

I claim:

1. A multiaxial, multilayer fabric suitable for being used for ballistic uses, comprising:
   a plurality of first layers of threads, in which all the threads of each layer are arranged to extend parallel to one another in a respective single direction;
   at least one second layer comprising one of a thermoplastic, a thermosetting material, and a bonding substance;
   the threads of each two adjacent ones of said layers of threads being arranged to extend in two mutually different directions which form with one another an angle within the range from 0° to 360°, as measured by starting from an imaginary reference axis parallel to either of said directions;

each said second layer comprising one of a thermoplastic, a thermosetting material, and a bonding substance being interposed between a respective adjacent two of said layers of threads and interpenetrating the respective said adjacent two layers of threads; and all of said first and second layers being bound to one another through said fabric, by textile binding elements.

2. The multiaxial multilayer fabric according to claim 1, wherein:

said angle is one of 45°, 135°, 25° and 315°.

3. A multiaxial, multilayer fabric according to claim 1, wherein:

at least one said second layer is a polyurethane film.

4. A bulletproof jacket comprising:

a ballistic panel of multiaxial, multilayer fabric comprising:
- a plurality of first layers of threads, in which all the threads of each layer are arranged to extend parallel to one another in a respective single direction;
- at least one second layer comprising one of a thermoplastic, a thermosetting material, and a bonding substance;
- the threads of each two adjacent ones of said layers of threads being arranged to extend in two mutually different directions which form with one another an angle within the range from 0° to 360°, as measured by starting from an imaginary reference axis parallel to either of said directions;
- each said second layer comprising one of a thermoplastic, a thermosetting material, and a bonding substance being interposed between a respective adjacent two of said layers of threads and interpenetrating the respective said adjacent two layers of threads; and
- all of said first and second layers being bound to one another through said fabric, by textile binding elements.

5. A process for manufacturing a multiaxial, multilayer fabric, comprising:

arranging in alternation thickness wise of the fabric a plurality of first layers and second layers, comprising:
- a plurality of first layers of threads, in which all the threads of each layer are arranged to extend parallel to one another in a respective single direction; and
- at least one second layer comprising one of a thermoplastic, a thermosetting material, and a bonding substance;
- the threads of each two adjacent ones of said layers of threads being arranged to extend in two mutually different directions which form with one another an angle within the range from 0° to 360°, as measured by starting from an imaginary reference axis parallel to either of said directions;
- each said second layer comprising one of a thermoplastic, a thermosetting material, and a bonding substance be interposed between a respective adjacent two of said layers of threads and interpenetrating the respective said adjacent two layers of threads;

binding all of said first and second layers to one another through said fabric by textile binding elements; and compressing all of said first and second layers together using only one single compressing step, and thereby causing each said second layer to interpenetrate a respective adjacent two of said first layers.

* * * * *